E. T. JACOBSON.
HOISTING AND UNLOADING SLING FOR WAGONS AND THE LIKE.
APPLICATION FILED FEB. 14, 1920.
1,367,976.
Patented Feb. 8, 1921.
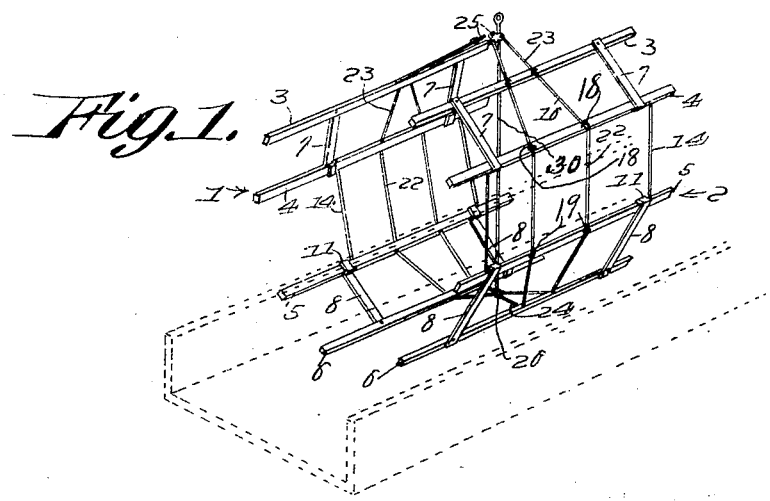
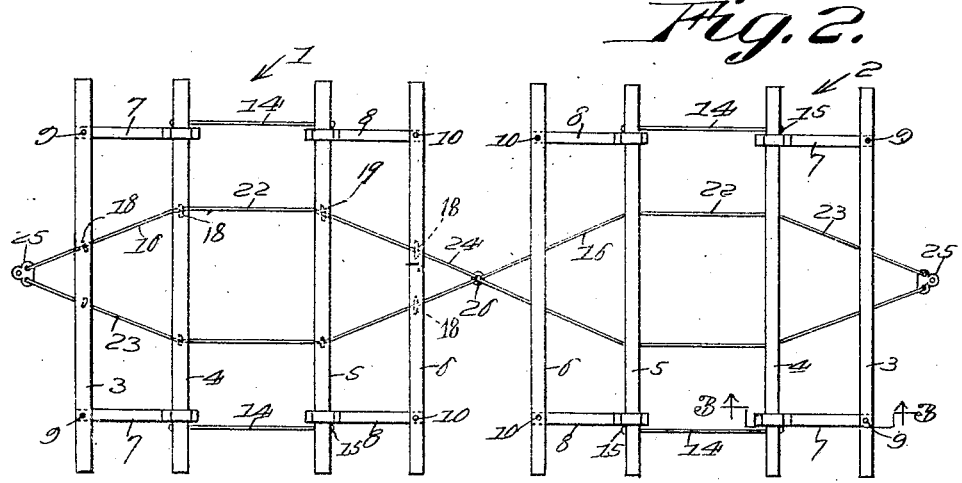
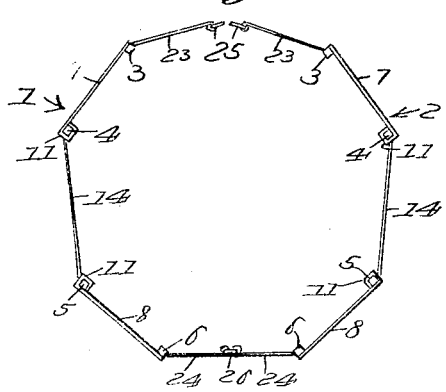
Inventor
E. T. Jacobson,
By Watson E. Coleman,
Attorney

UNITED STATES PATENT OFFICE.

ELMER T. JACOBSON, OF STANLEY, NORTH DAKOTA.

HOISTING AND UNLOADING SLING FOR WAGONS AND THE LIKE.

1,367,976.   Specification of Letters Patent.   Patented Feb. 8, 1921.

Application filed February 14, 1920. Serial No. 358,743.

*To all whom it may concern:*

Be it known that I, ELMER T. JACOBSON, a citizen of the United States, residing at Stanley, in the county of Mountrail and State of North Dakota, have invented certain new and useful Improvements in Hoisting and Unloading Slings for Wagons and the like, of which the following is a specification, reference being had to the accompanying drawings.

This invention relates to an improved hoisting and unloading sling for wagons, carts, cars and the like, and an object of the invention is to provide a device of this kind particularly adapted for hoisting and unloading bundles of material from loaded carts, cars or wagons, and especially adapted for unloading hay, cane, corn and the like, whereby the material to be hoisted or lifted may be easily and quickly removed, and then easily, quickly and conveniently moved from the sling.

Another object is to provide a pair of sling sections of a flexible character to readily conform to the bundle to be hoisted, in combination with means for quickly detaching the sections, to permit the discharge or the release of the bundle.

A further object of the invention is to provide a sling section consisting of a plurality of transverse bars, connected in pairs by metallic strips, which may be rigid or flexible, there being flexible connections between the pairs, in combination with opposing cable parts, which also permit the bars to slide, and at certain of their ends with means whereby the sections can be suspended in coöperation with a similar section, and means at their opposite ends for detachably connecting to a similar section, whereby a bundle can be easily hoisted and then released.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in perspective, showing the unloading sling constructed in accordance with the invention and showing the sling arranged in the form of a loop to hold and support the material to be unloaded over a wagon or the like, shown in dotted lines, Fig. 2 is a plan view of the sling showing the sling sections opened up and lying out flat.

Fig. 3 is a sectional view on line 3—3 of Fig. 2,

Fig. 4 is a view in elevation of the sling, showing the cable 30 eliminated, in which case the bundle may be released by separating the two sections 26.

Referring to these drawings, 1 and 2 designate a pair of sling sections, which are similarly constructed. Each sling section comprises a plurality of transversely disposed bars 3, 4, 5 and 6. These bars are in parallelism and the bars 3 and 4 constitute one pair, whereas the bars 5 and 6 constitute the other pair. Connecting bars or plates 7 and 8 are bolted or otherwise pivotally connected at 9 and 10 to the end bars 3 and 6. U-shaped or arched shaped plates 11 straddle the bars 4 and 5 and have lateral ears 12, through which suitable securing bolts or the like 13 pass into and through the strips or metal bars 7 and 8. These arching plates straddle the bars 4 and 5 and hold the straps or metallic bars 7 and 8 connected to the intermediate bars 4 and 5.

The adjacent bars 4 and 5 adjacent their ends are connected by short cables 14, the ends of which are secured fixedly in any suitable manner as at 15 to the bars. The bars 3 and 6 at adjacent points and substantially midway their ends are provided with means such as indicated at 18 to receive the cables 16. The holding means 18 may be either eyes or staples or other suitable device, which may engage the cables. The bars 4 and 5 are provided at points between their ends with staples 19 which also receive the cables 16. In so far as the connections of the cables 16 to the various bars is concerned, the mode of connection is immaterial. The cables 16 are arranged preferably as shown so as to provide the parallel parts 22 and the converging parts 23 and 24. By this arrangement of the cables 16, it will be seen that the transverse bars, while they are slidable on the cables will be kept in their proper positions as shown so as to coöperate with the other sling section, in order to hold a bundle of material such as hay, corn and the like. The ends of the converging parts 23 are connected to a hanger plate 25, and as the two sling sections are identical in construction, the hanger plates 25 of both sections may be brought together so as to connect with a suitable husking device, not shown, whereby a bundle of any material may be carried in the sling and positioned over a wagon body so that when the sling sections are released, the bundle may readily deposit into the wagon.

The extremity of the converging parts 24 of both sections are detachably connected as shown at 26 and when this connection is severed the two sections are permitted to separate, allowing the release of the bundle of hay, corn and the like to drop into the wagon body or preferably into a silo, or into any other container.

In Fig. 1 a cable 30 is attached to the plate or link 26 in any suitable manner and is adapted to extend upwardly and as shown it terminates in an eye whereby it may be attached to any suitable hoisting cable (not shown). The plates 25 at the opposite ends of the cables 16 also have eyes which are capable of attachment to a hook or other device (not shown) at the lower extremity of the hoisting cable (not shown), when the parts of the sling assume the positions as in Fig. 1. In using the sling, it is placed over the wagon body, with the opposite parts engaging over the sides of the body and depending downwardly, while the cable 30 is attached to the hoisting cable (not shown). The material to be hoisted is deposited on the sling and when the requisite amount is so arranged with the cable 30 extending upwardly through the material, the opposite sides or end portions of the sling are brought together so that the plates 25 may be connected to the hook (not shown) of the hoisting cable. The sling and the material therein is then hoisted and carried to any suitable location, and when it is desired to deposit the material, the hook plates are released in which case the opposite end parts of the sling will depend downwardly permitting the release of the material. If desired, the plates 25 may be connected to suitable cables (not shown) which may pass over pulleys or through suitable eyes (not shown) of the hoisting cable so that these plates may be released by the operator while the sling is in an elevated or raised position.

The invention having been set forth, what is claimed as new and useful is:

1. In a loading and unloading hoisting sling, the combination with a pair of sling sections, each comprising a plurality of transverse elongated bars arranged in parallelism and in pairs, of metallic strips pivoted to certain of the bars of each pair and in turn having a sliding arch connection with the other bar of each pair, flexible connections between the pairs of bars and a pair of cables arranged adjacent and adjustably connected to all the bars of one section, said flexible connections of one section having detachable means coupled with a corresponding means of the other section, whereby the two sections may be held in opposing relations against the opposite sides of the bundle.

2. In a loading and unloading sling, the combination with a pair of sling sections, each comprising a plurality of transverse parallel bars arranged in pairs, of parallel straps connected to certain of the remote bars of each pair, and in turn having arch connections with the other bars of the opposing pairs, flexible connections between the pairs of bars, cables having parallel parts connected to the intermediate bars and having converging end portions connected to the remote bars, certain ends of the said cables having hanger plates, the other ends of said cables having means for detachably connecting with the corresponding cables of the other sling section, whereby the two sections may engage a bundle in opposed relation thereagainst.

3. In a loading and unloading sling, the combination with a pair of sling sections, each section comprising a plurality of transversely disposed parallel bars arranged in pairs, flexible metallic strips connecting the bars of each pair, flexible cables connecting the intermediate bars of the sling section, and cables having adjustable connections with all the bars of the sling section, said last mentioned cables having parallel parts, and terminating at their opposite ends in converging portions, the ends of certain of the converging end portions having a hanger plate to coöperate with a similar hanger plate of the other sling section, and means detachably connecting the other converging ends of the cables to corresponding ends of the cables of the other sling section so that the sling sections may contact with opposite parts of a bundle to be hoisted, transferred and then released.

4. In a loading and unloading sling, the combination with a pair of sling sections, each comprising a plurality of horizontal parallel bars, means for connecting said bars in spaced parallel relation, cables having their intermediate portions disposed in parallel relation and adjustably connected to the intermediate bars of the section, said cables having converging end portions slidably and adjustably connected to the end bars, the extremities of certain of said converging end portions having a hanger plate to coöperate with a similar plate carried by the cables of the other section, whereby the sling may be suspended and hoisted, the extremities of the other converging ends of said cables having detachable connections with the extremities of corresponding converging end portions of the cables of the other spring section.

5. In a loading and unloading sling, the combination with a pair of sling sections, each comprising a plurality of transversely disposed parallel bars, arranged in pairs, metallic strips pivotally connected to the end bars of said section, and in turn having arch plate connections with the intermediate bars of said sling section, flexible cables connecting the intermediate bars of the sling section, and additional cables having their central parts in spaced parallelism, slidably and adjustably connected to the intermediate bars of said sling section, said last mentioned cables beyond the sliding adjustable connections having converging end portions slidably and adjustably connecting with the end bars of the sling section, the ends of certain of said converging end portions having a hanger plate to coöperate with a similar hanger plate of the other sling section, for suspending and lifting the two sections, the extremities of the other converging end portions of the last mentioned cable adapted to detachably connect with similar means of the extremities of the corresponding end portions of the cables of the other sling section, whereby as said detachable connections are severed, the bundle between the sections may be released.

In testimony whereof I hereunto affix my signature.

ELMER T. JACOBSON.